Patented Jan. 4, 1949

2,458,049

UNITED STATES PATENT OFFICE 2,458,049

TREATMENT OF HYDROCARBONS CONTAINING NEUTRAL ORGANIC SULFATE

Herman S. Bloch, Chicago, and George L. Hervert, Berwyn, Ill., assignors to Universal Oil Products Company, Chicago, Ill., a corporation of Delaware No Drawing. Application October 31, 1946, Serial No. 707,028

13 Claims. (Cl. 202—57)

1

This invention relates to the treatment of organic compounds. It is especially concerned with an improved method of heating and distilling an organic compound contaminated with a neutral organic sulfate.

Organic compounds frequently are contacted with sulfuric acid as in the polymerization of olefins, the alkylation of phenols, halobenzenes, and aromatic and isoparaffin hydrocarbons, the acid treatment of petroleum distillates, and the like. In most of these processes there is a small but definite production of acid and neutral organic sulfates, sulfonic acids, and sometimes sulfones, which appear in the products. Said products usually are separated from the unreacted material or are concentrated and recovered by means which include heating. It is customary to treat such products with an aqueous solution of alkali prior to such heating to remove the sulfuric acid dissolved therein. This treatment also removes the acid organic sulfates, and sulfonic acids, if any, but not the neutral organic sulfates such as dialkyl sulfates. The removal of these neutral sulfates is necessary because they undergo decomposition during heating and distillation, thereby liberating sulfuric acid which causes charring and oxidation with resultant contamination and discoloration of the desired products.

Heretofore, relatively complicated and expensive methods have had to be employed to remove the neutral organic sulfates. Such methods included passing the organic material containing said sulfates over bauxite at elevated temperatures or steam distilling the organic substance in the presence of aqueous acids. We have discovered a simple and inexpensive method of heating or distilling organic materials containing neutral organic sulfates without the difficulties usually concomitant with the decomposition of said sulfates.

In one embodiment our invention relates to the heating of an organic compound, containing a neutral organic sulfate, in the presence of a solid, substantially anhydrous, basic substance.

In a more specific embodiment our invention relates to an improvement in the distillation of an alkyl aromatic produced by the sulfuric acid alkylation of an aromatic compound with an alkylating agent and containing a neutral organic sulfate, said improvement comprising heating the alkyl aromatic in the presence of an alkali metal carbonate.

Any solid, substantially anhydrous, basic substance which is capable of combining with the sulfuric acid liberated by the decomposition of

2 the neutral organic sulfates may be used in our process. Examples of such substances are the carbonates, hydroxides, and oxides of magnesium, calcium, barium, strontium, lithium, sodium, and potassium. Compounds of this class act as scavengers and take up any sulfuric acid liberated during the heating or distillation and thus prevent the acid from catalyzing further decomposition and other undesirable reactions. The basic substances which we prefer to use in our process comprise the alkaline earth and alkali metal carbonates. By the term carbonate we mean any inorganic compound which contains the following group

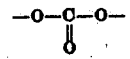

Such compounds therefore include substances such as $Na_2CO_3$, $NaHCO_3$, $CaCO_3$, and $CaHCO_3$.

The metal carbonates may be used to prevent the ill effects of decomposition in any process wherein organic compounds containing organic sulfates are subjected to elevated temperatures. For example, they may be used in the heating zones of conversion processes employing such organic compounds. A more important application is in the distillation of these materials. The carbonate in lesser amount than the organic substance being distilled may be placed in the bottom or reboiler section of the distillation column. However, it frequently is advantageous to place some of the scavenger in the bubble trays or in the packing. Alternatively, the heated organic material may be passed thru a bed of the carbonate at elevated temperature prior to distillation or other subsequent treatment.

The following example is given to illustrate our invention but it is not introduced with the intention of unduly limiting the generally broad scope of said invention.

Example

Toluene was alkylated with olefins in a continuous type experiment by charging 8 molal proportions of toluene per 1 molal proportion of an olefinic hydrocarbon fraction boiling in the range 180°–220° C. to a reactor containing 98% sulfuric acid maintained at 35° F. The contact time was 30 minutes. The effluent from the reactor was passed to an acid settler wherein a separation was effected between the hydrocarbon and acid phases. The acid phase was continuously recycled to the reactor and the hydrocarbon phase was caustic washed and dried and a portion of it was then distilled in a glass flask. During the distillation the material in the flask became discolored and acidic gases were liberated. A significant amount of tarry residue was left in the flask after distillation. In addition, analysis showed that a portion of the product had been converted into higher and lower boiling hydrocarbons. Apparently, the sulfuric acid liberated by decomposition of the neutral organic sulfates had catalyzed dealkylation of alkyl aromatics, conjunct polymerization of the liberated olefins, etc.

Another portion of the caustic washed and dried hydrocarbon phase was distilled in a glass flask in the presence of powdered sodium carbonate. This time there was no discoloration nor evolution of acidic gases and no tarry residue was left in the flask. Thus it can be seen that the presence of the sodium carbonate effectively prevented the charring and discoloration resulting from the decomposition of the neutral organic sulfates.

We have also found that if the caustic wash is omitted after the sulfuric acid treatment or if said wash fails to completely remove the residual acid and acid organic sulfates, the product will be protected from oxidation and contamination during heating and distillation by the presence of the metal carbonate.

We claim as our invention:

1. In the heating of hydrocarbons containing a neutral organic sulfate, the improvement which comprises heating the hydrocarbons in the presence of a solid, substantially anhydrous, basic substance.

2. In the heating of hydrocarbons containing a neutral organic sulfate, the improvement which comprises heating the hydrocarbons in the presence of a solid metal carbonate.

3. The process of claim 2 further characterized in that the metal carbonate is an alkaline earth metal carbonate.

4. In the heating of hydrocarbons containing a neutral organic sulfate, the improvement which comprises heating the hydrocarbons in the presence of an alkali metal carbonate.

5. The process of claim 4 further characterized in that the alkali metal carbonate is sodium carbonate.

6. The process of claim 4 further characterized in that the alkali metal carbonate is potassium carbonate.

7. In the distillation of hydrocarbons containing a neutral organic sulfate, the improvement which comprises distilling the hydrocarbons in the presence of a metal carbonate.

8. The process of claim 7 further characterized in that the metal carbonate is an alkaline earth carbonate.

9. The process of claim 7 further characterized in that the metal carbonate is an alkali metal carbonate.

10. In the distillation of an alkyl aromatic hydrocarbon produced by the sulfuric acid alkylation of an aromatic hydrocarbon with an alkylating agent and containing a neutral organic sulfate, the improvement which comprises distilling the alkyl aromatic hydrocarbon in the presence of an alkaline earth metal carbonate.

11. In the distillation of an alkyl aromatic hydrocarbon produced by the sulfuric acid alkylation of an aromatic hydrocarbon with an alkylating agent and containing a neutral organic sulfate, the improvement which comprises distilling the alkyl aromatic hydrocarbon in the presence of an alkali metal carbonate.

12. The process of claim 11 further characterized in that the alkali metal carbonate is sodium carbonate.

13. The process of claim 11 further characterized in that the alkali metal carbonate is potassium carbonate.

HERMAN S. BLOCH.
GEORGE L. HERVERT.

REFERENCES CITED

The following references are of record in the file of this patent:

UNITED STATES PATENTS

| Number | Name | Date |
|---|---|---|
| 2,139,179 | Tullenery | Dec. 6, 1938 |
| 2,231,026 | Quattlebaum | Feb. 11, 1941 |